US012603735B2

(12) United States Patent
Dong

(10) Patent No.: US 12,603,735 B2
(45) Date of Patent: Apr. 14, 2026

(54) COMMUNICATION METHOD AND DEVICE FOR INDICATING RESOURCE UNITS, ELECTRONIC DEVICE, AND COMPUTER-READABLE STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 492 days.

(21) Appl. No.: 18/000,790

(22) PCT Filed: Jun. 17, 2020

(86) PCT No.: PCT/CN2020/096656
§ 371 (c)(1),
(2) Date: Dec. 5, 2022

(87) PCT Pub. No.: WO2021/253300
PCT Pub. Date: Dec. 23, 2021

(65) Prior Publication Data
US 2023/0216631 A1 Jul. 6, 2023

(51) Int. Cl.
*H04L 5/00* (2006.01)
*H04W 72/0453* (2023.01)

(52) U.S. Cl.
CPC ....... *H04L 5/0048* (2013.01); *H04W 72/0453* (2013.01)

(58) Field of Classification Search
CPC .......................... H04L 5/0048; H04W 72/0453
See application file for complete search history.

(56) References Cited

U.S. PATENT DOCUMENTS

2020/0177425 A1 6/2020 Chen et al.
2021/0336752 A1* 10/2021 Kwon ................... H04L 5/0055

FOREIGN PATENT DOCUMENTS

| CN | 107534472 A | 1/2018 |
| CN | 108141261 A | 6/2018 |
| CN | 109714092 A | 5/2019 |
| CN | 111162825 A | 5/2020 |
| TW | 201935894 A | 9/2019 |

OTHER PUBLICATIONS

International Search Report and Written Opinion of International Application No. PCT/CN2020/096656, mailed Mar. 4, 2021, 16 pages.
Extended European Search Report issued in Application No. 20941027.3 dated Mar. 5, 2024, 10 pages.

* cited by examiner

*Primary Examiner* — Kevin C. Harper
(74) *Attorney, Agent, or Firm* — Finnegan, Henderson, Farabow, Garrett & Dunner, L.L.P.

(57) ABSTRACT

A communication method, includes: determining a first message frame, wherein the first message frame at least includes a subfield for indicating bandwidth information and the subfield for indicating bandwidth information is configured to identify configuration information for resource units (RUs) at a first channel bandwidth; and sending the first message frame.

20 Claims, 4 Drawing Sheets

Figure 2:
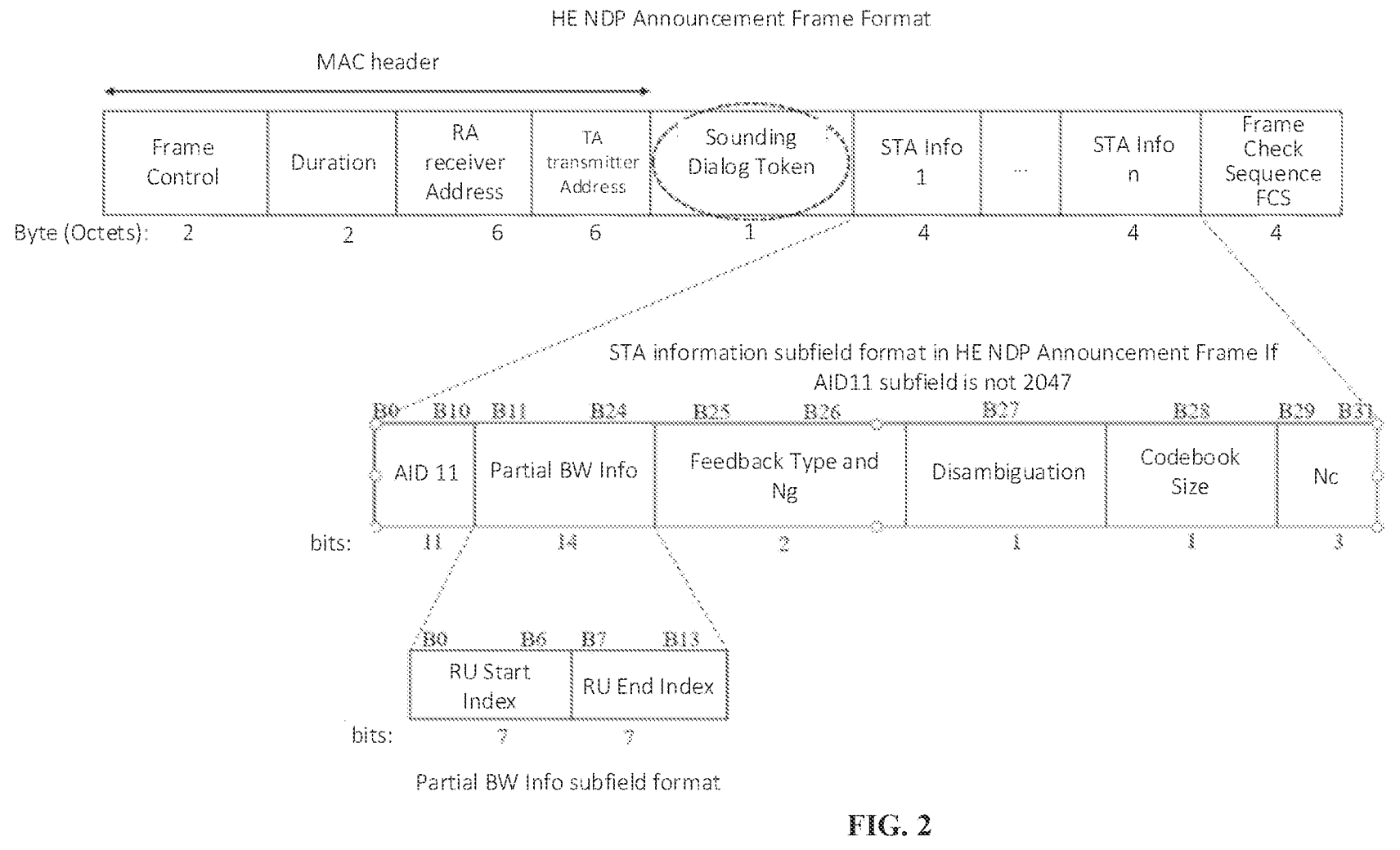

HE NDP Announcement Frame Format

MAC header

| Frame Control | Duration | RA receiver Address | TA transmitter Address | Sounding Dialog Token | STA info 1 | ... | STA Info n | Frame Check Sequence FCS |
|---|---|---|---|---|---|---|---|---|
| Byte (Octets): 2 | 2 | 6 | 6 | 1 | 4 | | 4 | 4 |

STA information subfield format in HE NDP Announcement Frame If AID11 subfield is not 2047

| B0 B10 | B11 B23 | B24 B25 | B26 B27 | B28 | B29 B31 |
|---|---|---|---|---|---|
| AID 11 | Partial BW Info | Feedback Type and Ng | Disambiguation | Codebook Size | Nc |
| bits: 11 | 14 | 2 | 1 | 1 | 3 |

| B0 B6 | B7 B13 |
|---|---|
| RU Start Index | RU End Index |
| bits: 7 | 7 |

Partial BW Info subfield format

FIG. 2 communication device 500

| processing module 510 | communicating module 530 |

FIG. 5 communication device 600

| receiving module 610 | processing module 630 |

FIG. 6

COMMUNICATION METHOD AND DEVICE FOR INDICATING RESOURCE UNITS, ELECTRONIC DEVICE, AND COMPUTER-READABLE STORAGE MEDIUM

CROSS-REFERENCE TO RELATED APPLICATION

This application is a national phase of international Application No. PCT/CN2020/096656, filed on Jun. 17, 2020, the content of which is hereby incorporated by reference in its entirety.

TECHNICAL FIELD

The present disclosure relates to a field of communication technologies, and specifically to a communication method, a communication device, an electronic device and a computer readable storage medium.

BACKGROUND in May, 2018, the Institute of Electrical and Electronic Engineers (IEEE) established a study group (SG) IEEE 802.11be standard to study a next generation (such as IEEE 802.11a/b/g/n/ac standard) of Wireless Fidelity (Wi-Fi) technologies, including 320 MHz bandwidth transmission, aggregation and collaboration of frequency bands, etc., which is expected to increase the rate and the throughput by at least four times relative to the existing IEEE 802.11ax standard. The next generation of Wi-Fi technologies is mainly applied to video transmission, augmented reality (AR), virtual reality (VR), etc.

Aggregation and collaboration of frequency bands refers to performing communication between devices in frequency bands of 2.4 GHz, 5.8 GHz and 6-7 GHz at the same time. Performing the communication between devices in a plurality of frequency bands at the same time needs to define a new Media Access Control (MAC) mechanism for management. In addition, it is also desirable to support low latency transmission in IEEE 802.11be standard.

SUMMARY

A communication method is provided in one aspect of the disclosure, and may include: determining a first message frame, in which the first message frame at least includes a subfield for indicating bandwidth information and the subfield for indicating bandwidth information is configured to identify configuration information for resource units (RUs) at a first channel bandwidth; and sending the first message frame.

A communication method is provided in one aspect of the disclosure, and may include: receiving a first message frame, in which the first message frame at least includes a subfield for indicating bandwidth information and the subfield for indicating bandwidth information is configured to identify configuration information for resource units (RUs) at a first channel bandwidth; and determining a RU for sending a second message frame based on the configuration information of the RUs identified by the subfield for indicating bandwidth information.

An electronic device is provided in one aspect of the disclosure. The electronic device includes a memory and a processor. The memory stores a computer program and the processor is configured to perform the above method when running the computer program.

A computer readable storage medium with a computer program stored thereon is provided in one aspect of the disclosure. The computer program is configured to perform the above method when running by a processor.

According to the above technical solution in embodiments of the disclosure, the NDP announcement frame may be applied to a larger communication bandwidth, which improves the throughput.

BRIEF DESCRIPTION OF TILE DRAWINGS

The above and additional features in the embodiments of the disclosure will be more obvious by describing example embodiments in the disclosure with reference to the following drawings.

FIG. 2 illustrates a format of a High Efficiency (HE) NDP announcement frame.

FIG. 5 is a schematic diagram illustrating a communication device according to some embodiments of the disclosure.

FIG. 6 is a schematic diagram illustrating a communication device according to some embodiments of the disclosure.

Throughout the accompanying drawings, similar reference numerals are used to describe the same or similar elements, features and structures.

DETAILED DESCRIPTION

The following description is provided with reference to accompanying drawings to facilitate comprehensive understanding of various embodiments of the disclosure as defined by the appended claims and their equivalents. Various embodiments of the disclosure include various details. However, the details are considered as examples only. In addition, for clarity and conciseness, descriptions of well-known functions and structures are omitted in the following descriptions.

The terms and words used in the disclosure are not limited to written meanings, but are only used by the inventors to understand the disclosure clearly and consistently. Therefore, for those skilled in the art, the description of various embodiments of the disclosure is provided only for purposes of illustration rather than for purposes of limitation.

It is understandable that the singular forms "a", "an", "the" and "said" as used herein may also include plural forms unless the context clearly indicates otherwise. It is further understandable that the expression "comprising" used herein refers to the presence of the described features, integers, steps, operations, elements and/or components, but does not preclude the presence or addition of one or more other features, integers, steps, operations, elements, components, and/or their groups.

It is understandable that, although the terms "first", "second", etc. may be used to describe various elements, the elements shall not be limited by the terms. These terms are only, configured to distinguish one element from another.

Therefore, the first element discussed below may be referred to as a second element without deviating from any teaching of example embodiments.

It is understandable that, when the element is referred to as "connected" or "coupled" to another element, it may be directly connected or coupled to other elements or there may be an intermediate element. In addition. "connected" or "coupled" used herein may include wireless connection or wireless coupling. The term "and/or" or the expression "at least one of" herein includes any and all combinations of one or more associated items.

In order to make the purpose, features and advantages of the embodiments of the disclosure more clear, the embodiments of the disclosure will be described below in connection with the accompanying drawings.

Figure 1:
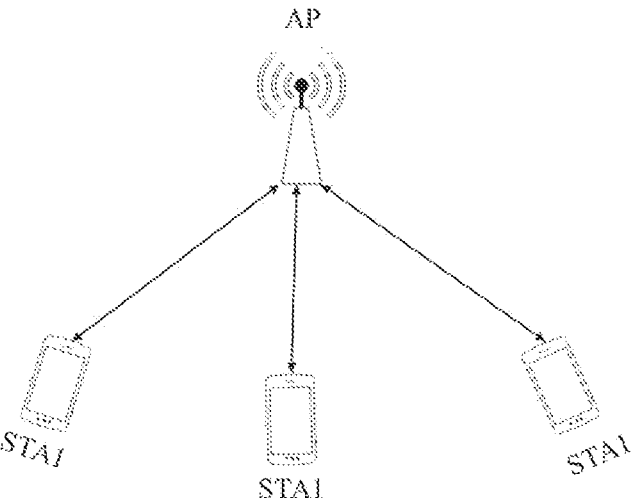
FIG. 1 is a schematic diagram illustrating an example of a Wireless Local Area Network (WEAN) deployment.

FIG. 1 is a schematic diagram illustrating an example of a Wireless focal Area Network (WLAN) deployment.

The WLAN may include one or more access points (AP) and station (STA) groups respectively communicating with the APs, where each STA group includes one or more STAs. Although FIG. 1 illustrates only one AP and three STAs (i.e., STA1 to STA3) communicating with the AP, FIG. 1 is only illustrative, which is not limited in the embodiments of the disclosure. For example, the communication system may include APs and STA groups respectively associated with the APs, where each STA group includes a plurality of STAs.

The AP may include a software application and/or a circuit, so that other types of nodes in a wireless network may communicate with external and internal wireless networks through the AP. In some examples, the AP may be a terminal device or a network device equipped with a Wireless Fidelity (Wi-Fi) chip. As an example, the STA may include, but is not limited to, a cellular phone, a smart phone, a wearable device, a computer, a personal digital assistant (PDA), a personal communication system (PCS) device, a personal information manager (PIM), a personal navigation device (PND), a global positioning system (GPS), a multimedia device, an Internet of Things (IoT) device, etc.

The AP may perform uplink and downlink transmissions with the STA on different time-frequency resources, and the AP may send a frame or packet to a corresponding STA and receive a frame or packet from the corresponding STA to transmit data and/or control information. For example, in a channel sounding process, an AP may be a beamformer (which is a beamforming initiator), and an STA may be a beamformee (which is a beamforming receiver). One or more APs may send an NDP announcement frame to an associated STA and may continue to send an NDP frame. The STA determines channel information for resource units (RUs) allocated to itself based on the received NDP announcement frame and the received NDP frame, and feeds back channel information to a corresponding AP, In the IEEE 802.11ax standard, a format of a High Efficiency (HE) null data packet (NDP) announcement frame is defined as illustrated in FIG. 2.

In FIG. 2, the STA info subfield (i.e., an STA Info 11 subfield) format of an eleventh STA in the STA Info 1 subfield to the STA Info N subfield is illustrated. In the STA info subfield, the Partial BW Info subfield defines a RU range fed back by a beamformee identified by Association Identifier (AID) 11 based on the request from the beamformer. The RU Start Index and the RU END Index included in the Partial BW Info subfield respectively define a start index and an end index of the RU range.

In the IEEE802.11ax standard, the RU Start Index and the RU End Index are defined as follow.

The RU Start Index subfield in the Partial BW Info subfield indicates the first 26-tone RU for which the HE beamformer is requesting feedback. The RU End Index subfield of the Partial BW Info subfield indicates the last 26-tone RU for which the HE beamformer is requesting feedback. The value of the RU Start Index subfield is less than or equal to the value of the RU End Index subfield. The RU Start Index subfield and RU End Index subfield depends on the bandwidth of the HE NDP Announcement frame, which is indicated by the TXVECTOR parameter CH_BANDWIDTH if the frame is carried in an HE, Very High Throughout (VHT) or High Throughout (HT) Physical layer Protocol Data Unit (PPDU) and by the TXVECTOR parameter CH_BANDWIDTH_IN_NON_HT if the frame is carried in a non-HT duplicate PPDU, and is 20 MHz if the frame is carried in non-HT PPDU. The values of the RU Start Index subfield and RU End Index subfield are each selected from the following.

Values 0 to 8 if the bandwidth of the HE NDP Announcement frame is 20 MHz, where 0 indicates 26-tone RU 1 and 8 indicates 26-tone RU 9. Values 9-127 are reserved.

Values 0 to 17 if the bandwidth of the HE NDP Announcement frame is 40 MHz, where 0 indicates 26-tone RU 1 and 17 indicates 26-tone RU 18. Values 18-127 are reserved.

Values 0 to 36 if the bandwidth of the HE NDP Announcement frame is 80 MHz, where 0 indicates 26-tone RU 1 and 36 indicates 26-tone RU 37. Values 37-127 are reserved.

Values 0 to 73 if the bandwidth of the HE NDP Announcement frame is 160 MHz, where 0 indicates 26-tone RU 1 and 73 indicates 26-tone RU 74. In the 80+80 MHz case, value 0 indicates the 26-tone RU 1 in the lower 80 MHz frequency segment and 36 indicates the 26-tone RU 37 in the lower 80 MHz frequency segment and 37 indicates the 26-tone RU 1 in the upper 80 MHz frequency segment and 73 indicates the 26-tone RU 74 in the upper 80 MHz frequency segment. Values 74-127 are reserved. For 80+80 MHz, feedback is not requested for the gap between the 80 MHz segments.

The maximum bandwidth supported by the IEEE 802.11be standard is 320 MHz (160 MHz+160 MHz). In addition, 240 MHz (160 MHz+80 MHz) and bandwidths supported by the IEEE802.11ax standard are further supported by the IEEE 802.11be standard. Since IEEE802.11be standard supports the 320 MHz (160+160 MHz) and the 240 MHz (160+80 MHz) but the existing IEEE802.11ax standard only supports the format and parameter configurations of a null data packet announcement (NDP) announcement frame supporting the maximum bandwidth of 160 MHz, the existing NDP announcement frame cannot applied to the IEEE802.11be standard, and needs to be enhanced.

Based on the above content, in the related art, the format and the parameter configuration of the NDP announcement frame are supported for the bandwidth up to 160 MHz, and the reserved bits at 20 MHz, 40 MHz, 80 MHz and 160/801-80 MHz may not be used to define the format and the parameter configuration of the NDP announcement frame for 240 MHz, 160 MHz+80 MHz, 320 MHz and 160+160 MHz in the 802.11be standard. Therefore, the format and the parameter of the NDP announcement frame need to be redefined for 240 MHz, 160 MHz+80 MHz, 320 MHz and 160+160 MHz in the 802.11be.

Figure 3:
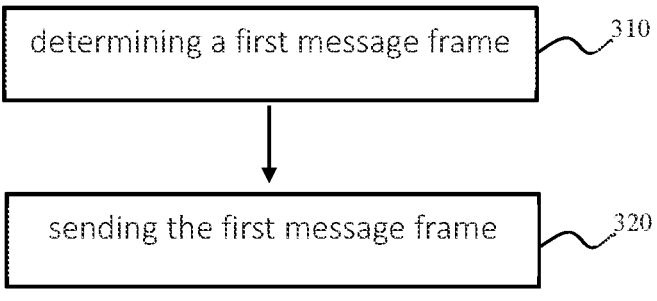
FIG. 3 is a flowchart illustrating a communication method according to some embodiments of the disclosure.

It is noteworthy that the embodiments of the disclosure may be applied to the following bandwidth ranges: 20 MHz, 40 MHz, 80 MHz, 160/80+80 MHz, 240/160+80 MHz, 320/160+160 MHz. All embodiments of the disclosure are illustrated by taking the above candidate bandwidth values as an example. However, it is noteworthy that, the specific numeric values of the candidate bandwidth values are only illustrative, rather than a limitation of the scope of the embodiments of the disclosure. In the embodiment of the disclosure, candidate bandwidth values supported by different standards are not limited and any candidate bandwidth value is within the protection scope of the embodiment of the disclosure, FIG. 3 illustrates a communication method according to some embodiments of the disclosure. The communication method as illustrated in FIG. 3 may be performed by a control end device. In the embodiments of the disclosure, the control end device includes but is not limited to a beamformer, for example, an AP or any type of controller. For example, the AP is taken as the beamformer for convenience.

As illustrated in FIG. 3, at block 310, a first message frame is determined. According to an example embodiment, the first message frame at least includes a subfield for indicating bandwidth information, and the subfield for indicating bandwidth information is configured to identify configuration information for resource units (RUs) al a first channel bandwidth. At block 320, a first message frame is sent. In embodiments of the disclosure, there are many ways for determining the first message frame. For example, the AP may determine the first message frame based on at least one of the following: a network condition, a load condition, a hardware capability of a control end device, a hardware capability of a receiving end device, a service type, or a related protocol provision, which are not limited in embodiments of the disclosure. In embodiments of the disclosure, the AP further may obtain the first message frame from an external device, which is not limited in the embodiments of the disclosure.

As a non-restrictive example, the configuration information as described at block 310 represents that the channel state information (CSI) that a beamformer (for example, an AP) requests a beamformee (for example, an associated STA) to feed back for each RU. For example, the first channel bandwidth may correspond to any one or more of following bandwidths: 20 MHz, 40 MHz, 80 MHz, 160 MHz/80+80 MHz, 240 MHz/160+80 MHz (also referred to as a second type of bandwidth below) or 320 MHz/160+160 MHz (also referred to as a first type of bandwidth below).

In all embodiments of the disclosure, the start position and the end position each may, be an absolute value or a relative value. Taking the start position as an example, the absolute value means that the start position is an RU index value, and the relative value means that the start position is an RU offset value relative to a reference point. For example, the first type of bandwidth may be 320 MHz, the first type of bandwidth may be divided into a high frequency band and a low frequency band in some examples, the low frequency band corresponds to 0-73 RU, and the high frequency band corresponds to 74-147 RU. The start position may be an offset value relative to a start point of the high frequency band. For example, when the absolute value of the start position of the RUs is 100, the offset value of the start position relative to the reference point (e.g., a start point of the high-frequency band with the index value of 76) may be 26 (100−74=26), In all embodiments of the disclosure, the start position may be an absolute value or a relative value, and the end position may also be an absolute value or a relative value, which are not repeated here. However, the above is merely exemplary, which is not limited in embodiments of the disclosure.

In all embodiments of the disclosure, the start position identifier may indicate an RU start position (which is an absolute value or a relative value), and the end position identifier may represent the number of RUs. For example, the start position identifier may be 125, and the end position identifier may be 5, which represents that the beamformer requests through the first message frame, the beamformee to feed back CSIs for the 26-tone RU 125 to the 26-tone RU 130 (i.e., 130=125+5), However, the above is merely an example, which is not limited in embodiments of the disclosure.

According to some embodiments, the first message frame may include a single frame, or a plurality of frames. For example, the first message frame may include an NDP announcement frame, and also include a subsequent NDP frame that needs to be sent. The disclosure mainly describes the NDP announcement frame, but it is understandable that embodiments of the disclosure are not limited thereto. At block 310, as an example, the format of the first message frame is similar to the format of the NDP announcement frame illustrated in FIG. 2, and the subfield for indicating bandwidth information included in the first message frame will be described below.

According to embodiments of the disclosure, the first message frame at least further includes a type identifier for indicating the type of the first message frame. When the first message frame is applied to the IEEE802.11 be standard, the type identifier included in the first message frame may indicate that the type of the first message frame is a frame of the IEEE802.11be standard.

According to embodiments of the disclosure, the format of the HE NDP announcement frame as illustrated in FIG. 2 may be redefined. For example, the type identifier of the first message frame may be defined in a sounding dialog token subfield, as illustrated in Table below.

TABLE 1

| | B0~~B1~~ Reserved (reserved) | B1 HE (Type) | B2 B7 Sounding Dialog Number (number of Sounding Dialog Tokens) |
|---|---|---|---|
| Bits | ~~2~~ 1 | 1 | 6 |

In the Table 1, the sounding dialog token number subfield includes a value selected by the beamformer to identify an NDP announcement frame, which is similar to the IEEE802.11ax standard and will not be repeated here for conciseness.

As illustrated in Table 1, in the existing HE NDP announcement frame, the Reserved subfield in the sounding dialog token subfield includes two bits, and the existing NDP announcement frame does not include the type identifier for indicating the type of the first message frame. According to embodiments of the disclosure, one bit in the Reserved subfield may be configured to define the type identifier for indicating the type of the first message frame (for example, the HE subfield in Table 1). That is, one hit in the Reserved subfield is configured as an HE subfield, and the type of the first message frame is defined in the HE subfield. For example, the type of the first message frame may be a frame of the IEEE802.11be standard or a frame of other related standards. However, the above is merely an example, which is not limited in embodiments of the disclosure. For example, the type identifier included in the first message frame may be located in the frame control subfield as illustrated in FIG. 2 (for example, one or more reserved bits in the frame control subfield). For example, when the first message frame is applied to the IEEE802.11be standard, the type identifier of the first message frame in the frame control subfield may be a frame of the IEEE802.11be standard. In addition, as another example, the type identifier for indicating a type of the first message frame may be included in a physical frame header portion of the first message frame. In this case, the type identifier indicates bandwidth type information. For example, bandwidth type information is indicated by the bandwidth (BW) subfield.

The subfield for indicating bandwidth information included in the first message frame will be described in detail. As a non-restrictive embodiment, the subfield for indicating bandwidth information may be a partial BW Info subfield in FIG. 2. However, the above is merely an example, and the format of the subfield for indicating bandwidth information may vary based on the format of the first message frame.

According to some embodiments of the disclosure, in the first message frame, the subfield for indicating bandwidth information at least includes: a start position identifier for indicating a start position of a first channel bandwidth and an end position identifier for indicating an end position of a first channel bandwidth. That is, in the subfield for indicating bandwidth information, the start position identifier may be defined to indicate the start position for the RUs within the bandwidth range of the first channel bandwidth and the end position identifier may be defined to indicate the end position for the RUs within the bandwidth range of the first channel bandwidth. As a non-restrictive embodiment, the example of the start position identifier may be the RU Start Index field as illustrated in FIG. 2, and the example of the end position identifier may be the RU End Index as illustrated in FIG. 2. The start position identifier and an end position identifier in embodiments of the disclosure will be described below.

According to embodiments of the disclosure, in the first message frame, the first channel bandwidth corresponds to the first type of bandwidth. In this case, the subfield for indicating bandwidth information included in the first message frame may include the start position identifier and the end position identifier for indicating the start position and the end position of the RUs within the bandwidth range corresponding to the first type of bandwidth. For example, the first type of bandwidth may be 320 MHz, and the indexes of the RUs within the bandwidth range corresponding to the first type of bandwidth may be 0-147. That is, when the first type of bandwidth is 320 MHz, there may be 148 26-tone RUs. In other words, the start position identifier and the end position identifier may be equal to values from 0 to 147. For example, the start position identifier may be 125, and the end position identifier may be 130, which represents that the beamformer requests the beamformee to feed back CSIs for RUs of the 26-tone RU 125 to the 26-tone RU 130 through the first message frame. In another example, the start position identifier may be an index value indicating the RU start position, and the end position identifier may represent the number of RUs. For example, the start position identifier may be 125, and the end position identifier may be 5, which represents that the beamformer requests the beamformee to feed back CSIS for each of the 26-tone RU 125 to the 26-tone RU 130 through the first message frame. However, the above is merely an example, which is not limited in embodiments of the disclosure.

According to embodiments of the disclosure, the first channel bandwidth corresponds to a first type of bandwidth (for example, 160+160 MHz). In this case, the subfield for indicating bandwidth information includes: the start position identifier and the end position identifier for indicating the start position and the end position of low-frequency band RUs within the bandwidth range corresponding to the first type of bandwidth, or the start position identifier and the end position identifier for indicating the start position and the end position of high-frequency band UEs within the bandwidth range corresponding to the first type of bandwidth. In an example, the low-frequency band may be a lower 160 MHz of the first type of bandwidth (for example, 160+160 MHz). In this case, the indexes of the low-frequency band. RUs within the bandwidth range corresponding to the first type of bandwidth may be 0-73, which represents that the number of the low-frequency band 26-tone RUs within the lower 160 MHz is 74. That is, in the lower 160 MHz, the start position identifier and the end position identifier are equal to values from 0 to 73. In an example, the high-frequency band may be a higher 160 MHz of the first type of bandwidth (for example, 160+160 MHz). In this case, the indexes of the high-frequency band RUs within the bandwidth range corresponding to the first type of bandwidth may be 74-147, which represents that the number of the high-frequency band. 26-tone RUs within the higher 160 MHz is 74. That is, in the higher 160 MHz, the start position identifier and the end position identifier are equal to values from 74 to 147. However, the above is merely an example, the embodiments of the disclosure are not limited thereto. The example "the start position identifier may be an RU index value indicating the start position and the end position identifier may represent the number of RUs" may be applied to the lower 160 MHz and the higher 160 MHz, and the descriptions are omitted for conciseness.

According to embodiments of the disclosure, in the first message frame, the first channel bandwidth corresponds to the second type of bandwidth. In this case, the subfield for indicating bandwidth information included in the first message frame may include the start position identifier and the end position identifier for indicating the start position and the end position of RUs within the bandwidth range corresponding to the second type of bandwidth. For example, the second type of bandwidth may be 240 MHz, and the indexes of the RUs within the bandwidth range corresponding to the second type of bandwidth may be 0-110. That is, when the second type of bandwidth is 240 MHz, there are 111 26-tone RUs. In other words, the start position identifier and the end position identifier are equal to values from 0 to 111. For example, the start position identifier may be 70, and the end position identifier may be 80, which represents that the beamformer requests the beamformee to feed back CSIs for the 26-tone RU 70 to the 26-tone RU 80 through the first message frame. However, the above is merely an example, and embodiments of the disclosure is not limited thereto. The example "the start position identifier may be an RU index value indicating the start position and the end position identifier may represent the number of RUs" may be applied to the second type of bandwidth, and the descriptions are omitted for conciseness.

According to embodiments of the disclosure, the first channel bandwidth corresponds to a second type of bandwidth (for example, 160+80 MHz). In this case, the subfield for indicating bandwidth information includes: the start position identifier and the end position identifier for indicating the start position and the end position of low-frequency band RUs within the bandwidth range corresponding to the second type of bandwidth, or the start position identifier and the end position identifier for indicating the start position and the end position of high-frequency band UEs within the bandwidth range corresponding to the second type of bandwidth. In an example, the low-frequency band may be a lower 160 MHz of the second type of bandwidth (for example, 160+80 MHz), In this case, the indexes of the low-frequency band RUs within the bandwidth range corresponding to the second type of bandwidth may be 0-73, which represents that the number of the low-frequency band 26-tone RUs within the lower 160 MHz is 74. That is, in the lower 160 MHz, the start position identifier and the end position identifier are equal to values from 0 to 73. In an example, the high-frequency band may be a higher 80 MHz of the second type of bandwidth (for example, 160+80 MHz). In this case, the indexes of the high-frequency band RUs within the bandwidth range corresponding to the second type of bandwidth may be 74-110, which represents that the number of the high-frequency band 26-tone RUs within the higher 80 MHz is 37. That is, in the higher 80 MHz, the start position identifier and the end position identifier are equal to values from 74 to 110. However, the above is merely an example, the embodiments of the disclosure are not limited thereto. The example "the start position identifier may be an RU index value indicating the start position and the end position identifier may represent the number of RUs" may be applied to the lower 160 MHz and the higher 80 MHz, and the descriptions are omitted for conciseness.

According to embodiments of the disclosure, the first channel bandwidth corresponds to the second type of bandwidth (for example, 240 MHz or 160+80 MHz). In this case, the subfield for indicating bandwidth information may include: the start position identifier and the end position identifier for indicating the start position and the end position of first-frequency band RUs within the bandwidth range corresponding to the second type of bandwidth, or the start position identifier and the end position identifier for indicating the start position and the end position of second-frequency band RUs within the bandwidth range corresponding to the second type of bandwidth, or the start position identifier and the end position identifier for indicating the start position and the end position of third-frequency band RUs within the bandwidth range corresponding to the second type of bandwidth. In an example, the first frequency band indicates a lower 80 MHz of the second type of bandwidth (for example, 240 MHz or 160+80 MHz). In this case, the indexes of the first-frequency-band RUs within the bandwidth range corresponding to the second type of bandwidth may be 0 to 36, which represents that the number of the low-frequency-band 26-tone RUs within the low-frequency-band 80 MHz is 74. That is, in the low-frequency-band 80 MHz, the start position identifier and the end position identifier are equal to values selected from a first value range of 0 to 36. In an example, the second frequency band may be a middle-frequency-band 80 MHz of the second type of bandwidth. In this case, the indexes of the second-frequency-band RUs within the bandwidth range corresponding to the second type of bandwidth may be 37 to 73, which represents that the number of middle-frequency-band 26-tone RUs within the middle-frequency-band 80 MHz is 37. That is, in the middle-frequency-band 80 MHz, the start position identifier and the end position identifier are equal to values selected from a second value range from 37 to 73. In an example, the third frequency band may be the high-frequency-band 80 MHz of the second type of bandwidth. In this case, the indexes of the third-frequency-band.

RUs within the bandwidth range corresponding to the second type of bandwidth may be 74 to 110, which represents that the number of high-frequency-band 26-tone RUs within the high-frequency-band 80 MHz is 37. That is, in the high-frequency-band 80 MHz, the start position identifier and the end position identifier are equal to values selected from a third value range from 74 to 110. However, the above is only illustrative, and embodiments of the disclosure are not limited thereto, for example, the first frequency band, the second frequency band and the third frequency band may be different from "the low-frequency-band 80 MHz, the middle-frequency-band 80 MHz, the high-frequency-band 80 MHz". In addition, The example "the start position identifier may be an RU index value indicating the start position and the end position identifier may represent the number of RUs" may be applied to the first frequency band, the second frequency band the third frequency band, and the descriptions are omitted for conciseness.

In addition, the embodiments of the disclosure may be applied to the above first type of bandwidth and the second type of bandwidth, and also may be applied to bandwidths (such as 20 MHz, 40 MHz, 80 MHz, 160 MHz of the IEEE802.11ax standard) in the existing standard. For example, it may indicate in a physical frame that the first message frame is a frame of the existing standard, or indicate in the frame control subfield or the sounding dialog token subfield of the NDP announcement frame that the first message frame is a frame of the existing standard. In this case, configurations of the start position identifier and the second position identifier are similar to the way as described in FIG. 2, which is omitted for conciseness.

The communication method according to embodiments of the disclosure defines a new format for the NDP announcement frame, its RU Start Index subfield and its RU End Index subfield, so that the new NDP announcement frame may be applied to a larger communication bandwidth, which improves the throughput.

Figure 4:
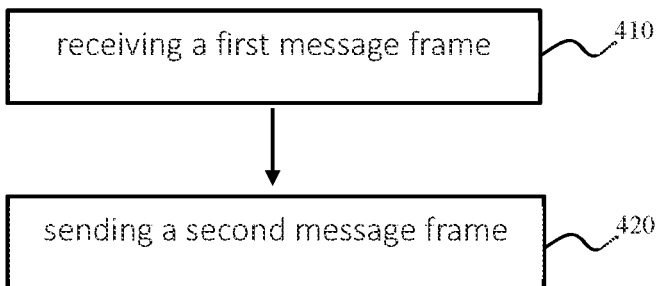
FIG. 4 is a flowchart illustrating a communication method according to some embodiments of the disclosure.

FIG. 4 is a flowchart illustrating a communication method according to embodiments of the disclosure. The method illustrated in FIG. 4 may be a method performed by a receiving end device (that is, a beamformee). In some embodiments, the receiving end device may be a STA.

As illustrated in FIG. 4, at block 410, a first message frame is received. The first message frame at least includes a subfield for indicating bandwidth information. The subfield for indicating bandwidth information is configured to identify configuration information for RUs at a first channel bandwidth. The first message frame and the subfield for indicating bandwidth information are similar with the descriptions referring to FIG. 3, which are omitted for conciseness.

At block 420, a RU for sending a second message frame is determined based on the configuration information of the RUs indicated by the subfield for indicating bandwidth information. As an example, the second message frame may represent the CSI allocated by a first message frame to each RU of an associated STA. However, the above is only illustrative, and the disclosure conception is not limited thereto. The second message frame at block 402 also may be a feedback frame with another format.

FIG. 5 is a diagram illustrating a communication device 500 according to embodiments of the disclosure.

As illustrated in FIG. 5, the communication device 500 according to embodiments of the disclosure may include a processing module 510 and a communicating module 530. It is understandable that the configuration of the communication device 500 as illustrated in FIG. 5 is only an example, and the communication device according to the embodiments of the disclosure may include more or fewer modules.

The processing module 510 may be configured to determine a first message frame. The first message frame at least includes a subfield for indicating bandwidth information and the subfield for indicating bandwidth information is configured to identify configuration information for RUs at a first channel bandwidth. The communicating module 530 may be configured to send the first message frame. The first message frame and the subfield for indicating bandwidth information are similar with the descriptions referring to FIG. 3, which are omitted for conciseness.

The communication device 500 as illustrated in FIG. 5 may perform the operation corresponding to the communication method as illustrated in FIG. 3, which are omitted for conciseness.

FIG. 6 is a diagram illustrating a communication device 600 according to embodiments of the disclosure.

As illustrated in FIG. 5, the communication device 600 may include a receiving module 610 and a processing module 630. It is understandable that the configuration of the communication device 600 as illustrated in FIG. 6 is only an example, and the communication device may include more or fewer modules according to embodiments of the disclosure.

The receiving module 610 may be configured to receive a first message frame. The first message frame at least includes a subfield for indicating bandwidth information, and the subfield for indicating bandwidth information is configured to identify configuration information for RUs at a first channel bandwidth. The first message frame and the subfield for indicating bandwidth information are similar with the descriptions referring to FIG. 3, which are omitted for conciseness.

The processing module 630 may be configured to determine a RU for sending a second message frame based on the configuration information of the RUs identified by the subfield for indicating bandwidth information. As an example, the second message frame may represent channel state information (CSI) allocated by the first message frame to each RU of a communication device 600. However, the above is only an example and the disclosure conception is not limited thereto, and the second message frame may be a feedback frame with another format. In addition, the processing module 630 of the communication device 600 may be further configured to process the first message frame received by the receiving module 610, to determine a corresponding feedback frame.

The communication device in embodiments of the disclosure defines a new format of the NDP announcement frame, its RU Start index subfield and its RU End Index subfield, so that the new NDP announcement frame may be applied to a larger communication bandwidth, which improves the throughput.

In addition, "modules" in FIG. 5 and FIG. 6 may be implemented in combination of a software and/or a hardware, which will not be limited in the embodiment of the disclosure.

Based on the principle the same with the method provided in the embodiments of the disclosure, an electronic device is further provided in the embodiments of the disclosure. The electronic device includes a processor and a memory; the memory is stored with machine-readable instructions (also referred to as "a computer program"); and the processor is configured to execute machine-readable instructions to achieve any one method as illustrated in FIG. 3 and FIG. 4. As an example, the electronic device may be a part of a device for identifying a bandwidth, however, it is not limited in the embodiment of the disclosure, for example, the electronic device may be other nodes separated from the device for identifying a bandwidth.

A computer readable storage medium with a computer program stored thereon is further provided in the embodiments of the disclosure, when the computer program is performed by a processor, the any one method as illustrated in FIG. 3 and FIG. 4 is implemented.

A communication method includes: determining a first message frame, in which the first message frame at least includes a subfield for indicating bandwidth information and the subfield for indicating bandwidth information is configured to identify configuration information for resource units (RUs) at a first channel bandwidth; and sending the first message frame.

According to some embodiments, the subfield for indicating bandwidth information at least includes: a start position identifier for indicating a start position of a bandwidth range of the first channel bandwidth and an end position identifier for indicating an end position of the bandwidth range of the first channel bandwidth.

According to some embodiments, the first channel bandwidth corresponds to a first type of bandwidth, and the subfield for indicating bandwidth information includes a start position identifier and an end position identifier for indicating a start position and an end position of RUs within a bandwidth range corresponding to the first type of bandwidth.

According to some embodiments, the first channel bandwidth corresponds to a first type of bandwidth, and the subfield for indicating bandwidth information includes: a start position identifier and an end position identifier for indicating a start position and an end position of low-frequency-band RUs within a bandwidth range corresponding to the first type of bandwidth, or a start position identifier and an end position identifier for indicating a start position and an end position of high-frequency-band RUs within a bandwidth range corresponding to the first type of bandwidth.

According to some embodiments, the first channel bandwidth corresponds to a second type of bandwidth, and the subfield for indicating bandwidth information includes a start position identifier and an end position identifier for indicating a start position and an end position of RUs within a bandwidth range corresponding to the second type of bandwidth.

According to some embodiments, the first channel bandwidth corresponds to a second type of bandwidth, and the subfield for indicating bandwidth information includes: a start position identifier and an end position identifier for indicating a start position and an end position of low-frequency-band RUs within a bandwidth range corresponding to the second type of bandwidth, or a start position identifier and an end position identifier for indicating a start position and an end position of high-frequency-band RUs within a bandwidth range corresponding to the second type of bandwidth.

According to some embodiments, the first channel bandwidth corresponds to a second type of bandwidth, and the subfield for indicating bandwidth information includes: a start position identifier and an end position identifier for indicating a start position and an end position of first-frequency-band RUs within a bandwidth range corresponding to the second type of bandwidth, or a start position identifier and an end position identifier for indicating a start position and an end position of second-frequency-band RUs within a bandwidth range corresponding to the second type of bandwidth, or a start position identifier and an end position identifier for indicating a start position and an end position of third-frequency-band RUs within a bandwidth range corresponding to the second type of bandwidth.

According to some embodiments, the first message frame at least further includes a type identifier for indicating a type of the first message frame.

According to some embodiments, the first channel bandwidth corresponds to the first type of bandwidth or the second type of bandwidth, in which the first type of bandwidth is 320 MHz or 160 MHz+160 MHz, and the second type of bandwidth is 240 MHz or 160 MHz+80 MHz.

Another communication method includes: receiving a first message frame, in which the first message frame at least includes a subfield for indicating bandwidth information and the subfield for indicating bandwidth information is configured to identify configuration information for resource units (RUs) at a first channel bandwidth; and determining a RU for sending a second message frame based on the configuration information of the RUs identified by the subfield for indicating bandwidth information.

According to some embodiments, the subfield for indicating bandwidth information at least includes: a start position identifier for indicating a start position of a bandwidth range of a first channel bandwidth and an end position identifier for indicating an end position of a bandwidth range of a first channel bandwidth.

According to some embodiments, the first channel bandwidth corresponds to a first type of bandwidth, and the subfield for indicating bandwidth information includes a start position identifier and an end position identifier for indicating RUs within a bandwidth range corresponding to the first type of bandwidth.

According to some embodiments, the first channel bandwidth corresponds to a first type of bandwidth, and the subfield for indicating bandwidth information includes: a start position identifier and an end position identifier for indicating low-frequency-band RUs within a bandwidth range corresponding to the first type of bandwidth, or a start position identifier and an end position identifier for indicating high-frequency-band RUs within a bandwidth range corresponding to the first type of bandwidth.

According to some embodiments, the first channel bandwidth corresponds to a second type of bandwidth, and the subfield for indicating bandwidth information includes a start position identifier and an end position identifier for indicating RUs within a bandwidth range corresponding to the second type of bandwidth.

According to some embodiments, the first channel bandwidth corresponds to a second type of bandwidth, and the subfield for indicating bandwidth information includes: a start position identifier and an end position identifier for indicating low-frequency-hand RUs within a bandwidth range corresponding to the second type of bandwidth, or a start position identifier and an end position identifier for indicating high-frequency-band RUs within a bandwidth range corresponding to the second type of bandwidth.

According to some embodiments, the first channel bandwidth corresponds to a second type of bandwidth, and the subfield for indicating bandwidth information includes: a start position identifier and an end position identifier for indicting first-frequency-band RUs within a bandwidth range corresponding to the second type of bandwidth, or a start position identifier and an end position identifier for indicting second-frequency-band RUs within a bandwidth range corresponding to the second type of bandwidth, or a start position identifier and an end position identifier for indicting third-frequency-band RUs within a bandwidth range corresponding to the second type of bandwidth.

According to some embodiments, the first message frame at least further includes a type identifier for indicating a type of the first message frame.

According to some embodiments, the first channel bandwidth corresponds to the first type of bandwidth or the second type of bandwidth; and the first type of bandwidth is 320 MHz or 160 MHz+160 MHz, and the second type of bandwidth is 240 MHz or 160 MHz+80 MHz.

A communication device includes: a processing module, configured to determine a first message frame, in which the first message frame at least includes a subfield for indicating bandwidth information and the subfield for indicating bandwidth information is configured to identify configuration information for resource units (RUs) at a first channel bandwidth; and a communication module, configured to send the first message frame.

Another communication device includes: a receiving module, configured to receive a first message frame, in which the first message frame at least includes a subfield for indicating bandwidth information and the subfield for indicating bandwidth information is configured to identify configuration information for resource units (RUs) at a first channel bandwidth; and a processing module, configured to determine a RU for sending a second message frame based on the configuration information of the RUs identified by the subfield for indicating bandwidth information.

An electronic device includes a memory and a processor. The memory stores a computer program and the processor is configured to perform the above methods when running the computer program.

A non-transitory computer readable storage medium is provided, having a computer program stored thereon. The computer program is configured to perform the above methods when executed by a processor.

In an example embodiment, the processor may be configured to implement or execute various exemplary logical boxes, modules, and circuits described in conjunction with the contents in the disclosure, for example, a central processing unit (CPU), a universal processor, a digital signal processor (DSP), an application specific integrated circuit (ASIC), a field programmable gate array (FPGA) or other programmable logic device, a transistor logic device, a hardware component or any other combination. The processor may be a combination that implement a computation function, for example, a combination of one or more microprocessors, a combination of DSPs and microprocessors, etc.

In an example embodiment, the memory may be, for example, a Read Only Memory (ROM), a Random Access Memory (RAM), an Electrically Erasable Programmable Read Only Memory (EEPROM), a Compact Disc Read Only Memory (CD-ROM) or other disc memory, a disc memory (including a compact disc, a laser disc, an optical disc, a universal digital disc, a Blu-ray disc, etc.), a disk storage medium, or other magnetic storage devices, or any other medium that may be used to carry or store program codes in the form of instructions or data structures and that may be accessed by a computer, which is not limited here.

It is Understandable that Although Blocks in the Flowchart of the Accompanying drawings are sequentially displayed based on the indication of the arrows, these blocks are not necessarily executed in the sequence indicated by the arrows. Unless explicitly stated herein, these blocks are not executed in a strict sequence, and may be executed in other sequences. In addition, at least some of blocks in the flowchart of the attached drawings may include a plurality of subblocks or a plurality of stages, these sub-blocks or stages are not necessarily executed at the same moment, but may be executed at different moments, and the execution sequence thereof is also not necessarily performed in sequence, but may be performed in turn or alternately with at least one part of other blocks or sub-blocks of other blocks or stages.

Although the disclosure has been shown and described referring to some embodiments of the disclosure, it is understandable by those skilled in the art that various changes may be made in form and detail without departing from the scope of the disclosure, Therefore, the scope of the disclosure shall not be limited to embodiments, but defined by the attached claims and their equivalents.

What is claimed is:

1. A communication method, comprising:
determining a first message frame, wherein the first message frame at least comprises a partial bandwidth information (Partial BW Info) subfield and the Partial BW Info subfield is configured to identify configuration information for resource units (RUs), wherein the first message frame comprises a null data packet (NDP) announcement frame, and a value of the Partial BW Info subfield is associated with a bandwidth of a Physical layer Protocol Data Unit (PPDU) carrying the NDP announcement frame; and
sending the first message frame.

2. The method of claim 1, wherein the Partial BW Info subfield at least comprises:
a start position identifier for indicating a start position of a bandwidth range of a first channel bandwidth and an end position identifier for indicating an end position of a bandwidth range of the first channel bandwidth.

3. The method of claim 2, wherein the first channel bandwidth corresponds to a first type of bandwidth and the Partial BW Info subfield comprises a start position identifier and an end position identifier for indicating a start position and an end position of RUs within the bandwidth range corresponding to the first type of bandwidth.

4. The method of claim 2, wherein the first channel bandwidth corresponds to a first type of bandwidth and the Partial BW Info subfield comprises at least one of:
a start position identifier and an end position identifier for indicating a start position and an end position of low-frequency-band RUs within a bandwidth range corresponding to the first type of bandwidth, or
a start position identifier and an end position identifier for indicating a start position and an end position of high-frequency-band RUs within a bandwidth range corresponding to the first type of bandwidth.

5. The method of claim 2, wherein the first channel bandwidth corresponds to a second type of bandwidth, and the Partial BW Info subfield comprises a start position identifier and an end position identifier for indicating a start position and an end position of RUs within a bandwidth range corresponding to the second type of bandwidth.

6. The method of claim 2, wherein the first channel bandwidth corresponds to a second type of bandwidth, and the Partial BW Info subfield comprises at least one of:
a start position identifier and an end position identifier for indicting a start position and an end position of low-frequency-band RUs within a bandwidth range corresponding to the second type of bandwidth, or
a start position identifier and an end position identifier for indicting a start position and an end position of highfrequency-band RUs within a bandwidth range corresponding to the second type of bandwidth.

7. The method of claim 2, wherein the first channel bandwidth corresponds to a second type of bandwidth, and the Partial BW Info subfield comprises at least one of:
a start position identifier and an end position identifier for indicting a start position and an end position of first-frequency-band RUs within a bandwidth range corresponding to the second type of bandwidth,
a start position identifier and an end position identifier for indicting a start position and an end position of second-frequency-band RUs within a bandwidth range corresponding to the second type of bandwidth, or
a start position identifier and an end position identifier for indicting a start position and an end position of third-frequency-band RUs within a bandwidth range corresponding to the second type of bandwidth.

8. The method of claim 3, wherein the first channel bandwidth corresponds to at least one of the first type of bandwidth or a second type of bandwidth,
wherein the first type of bandwidth is 320 MHz or 160 MHz+160 MHz, and the second type of bandwidth is 240 MHz or 160 MHz+80 MHz.

9. A communication method, comprising:
receiving a first message frame, wherein the first message frame at least comprises a partial bandwidth information (Partial BW Info) subfield and the Partial BW Info subfield is configured to identify configuration information for resource units (RUs), wherein the first message frame comprises a null data packet (NDP) announcement frame, and a value of the Partial BW Info subfield is associated with a bandwidth of a Presentation Physical layer Protocol Data Unit (PPDU) carrying the NDP announcement frame; and
determining a RU for sending a second message frame based on the configuration information of the RUs identified by the Partial BW Info subfield.

10. The method of claim 9, wherein the Partial BW Info subfield at least comprises: a start position identifier for indicating a start position of a bandwidth range of a first channel bandwidth and an end position identifier for indicating an end position of a bandwidth range of the first channel bandwidth.

11. The method of claim 10, wherein the first channel bandwidth corresponds to a first type of bandwidth, and the Partial BW Info subfield comprises a start position identifier and an end position identifier for indicating a start position and an end position of RUs within a bandwidth range corresponding to the first type of bandwidth.

12. The method of claim 10, wherein the first channel bandwidth corresponds to a first type of bandwidth, and the Partial BW Info subfield comprises at least one of:
a start position identifier and an end position identifier for indicating a start position and an end position of low-frequency-band RUs within a bandwidth range corresponding to the first type of bandwidth, or
a start position identifier and an end position identifier for indicating a start position and an end position of high-frequency-band RUs within a bandwidth range corresponding to the first type of bandwidth.

13. The method of claim 10, wherein the first channel bandwidth corresponds to a second type of bandwidth, and the Partial BW Info subfield comprises a start position identifier and an end position identifier for indicating a start position and an end position of RUs within a bandwidth range corresponding to the second type of bandwidth.

14. The method of claim 10, wherein the first channel bandwidth corresponds to a second type of bandwidth, and the Partial BW Info subfield comprises at least one of:

a start position identifier and an end position identifier for indicating a start position and an end position of low-frequency-band RUs within a bandwidth range corresponding to the second type of bandwidth, or a start position identifier and an end position identifier for indicating a start position and an end position of high-frequency-band RUs within a bandwidth range corresponding to the second type of bandwidth.

15. The method of claim 10, wherein the first channel bandwidth corresponds to a second type of bandwidth, and the Partial BW Info subfield comprises at least one of:

a start position identifier and an end position identifier for indicting a start position and an end position of first-frequency-band RUs within a bandwidth range corresponding to the second type of bandwidth, a start position identifier and an end position identifier for indicting a start position and an end position of second-frequency-band RUs within a bandwidth range corresponding to the second type of bandwidth, or a start position identifier and an end position identifier for indicting a start position and an end position of third-frequency-band RUs within a bandwidth range corresponding to the second type of bandwidth.

16. The method of claim 11, wherein the first channel bandwidth corresponds to at least one of the first type of bandwidth or a second type of bandwidth; and wherein the first type of bandwidth is 320 MHz or 160 MHz+160 MHz, and the second type of bandwidth is 240 MHz or 160 MHz+80 MHz.

17. An electronic device, comprising:

a processor; and a memory storing a computer program executable by the processor;

wherein the processor is configured to:

determine a first message frame, wherein the first message frame at least comprises a partial bandwidth information (Partial BW Info) subfield and the Partial BW Info subfield is configured to identify configuration information for resource units (RUs), wherein the first message frame comprises a null data packet (NDP) announcement frame, and a value of the Partial BW Info subfield is associated with a bandwidth of a Physical layer Protocol Data Unit (PPDU) carrying the NDP announcement frame; and send the first message frame.

18. A non-transitory computer-readable storage medium, having a computer program stored thereon, wherein when the computer program is executed by a processor, the processor is caused to perform the method of claim 1.

19. An electronic device, comprising:

a processor; and a memory storing a computer program executable by the processor;

wherein the processor is configured to perform the method claim 9.

20. A non-transitory computer-readable storage medium, having a computer program stored thereon, wherein when the computer program is executed by a processor, the processor is caused to perform the method of claim 9.

\* \* \* \* \*